(12) United States Patent
Fichou et al.

(10) Patent No.: US 6,787,575 B1
(45) Date of Patent: Sep. 7, 2004

(54) METHOD FOR PROCESSING A MINERAL FILLERS WITH A PHOSPHATE, SAID FILLERS AND THEIR USES

(75) Inventors: Jean Pierre Fichou, Levallois Perret (FR); Maurice Husson, Chalons en Champagne (FR); Georges Ravet, Bouzigues (FR); Pierre Blanchard, Reyrieux (FR)

(73) Assignee: Omya SA, Paris (FR)

( * ) Notice: Subject to any disclaimer, the term of this patent is extended or adjusted under 35 U.S.C. 154(b) by 0 days.

(21) Appl. No.: 09/719,574

(22) PCT Filed: Jun. 17, 1999

(86) PCT No.: PCT/FR99/01456

§ 371 (c)(1),
(2), (4) Date: May 14, 2001

(87) PCT Pub. No.: WO00/00553

PCT Pub. Date: Jan. 6, 2000

(30) Foreign Application Priority Data

Jun. 30, 1998 (FR) .......................................... 98 08483

(51) Int. Cl.⁷ ................................................ B01F 17/42
(52) U.S. Cl. ........................ 516/31; 252/1; 252/182.24; 252/182.27; 516/33; 516/34; 516/199; 521/107; 521/114; 521/116; 521/117; 521/155; 521/170; 521/174
(58) Field of Search ................................. 252/1, 182.24, 252/182.27; 521/155, 170, 174, 107, 114, 116, 117; 516/31, 33, 34, 199

(56) References Cited

U.S. PATENT DOCUMENTS

| 5,412,139 A | 5/1995 | Blanchard et al. |
| 5,464,895 A | 11/1995 | Blanchard et al. |
| 6,159,390 A | 12/2000 | Fichou et al. |

FOREIGN PATENT DOCUMENTS

| BE | 667 292 A | | 1/1966 |
| BE | 670958 | * | 4/1966 |
| BE | 670 958 A | | 4/1966 |
| DE | 17 92 798 A | | 8/1977 |
| EP | 0 029 137 A | | 5/1981 |
| EP | 0 216 516 A | | 4/1987 |
| EP | 0 496 150 A | | 7/1992 |
| EP | 0726298 | * | 8/1994 |
| EP | 0 726 298 A | | 8/1996 |
| FR | 2 286 179 A | | 4/1976 |
| GB | 1 169 352 A | | 11/1969 |
| JP | 58168663 A | | 10/1983 |
| JP | 62161862 A | | 7/1987 |
| JP | 3074472 A | | 3/1991 |

* cited by examiner

Primary Examiner—John M. Cooney, Jr.
(74) Attorney, Agent, or Firm—Oblon, Spivak, McClelland, Maier & Neustadt, P.C.

(57) ABSTRACT

The invention relates to the technological sector of mineral fillers used in the sector which manufactures polyurethane foams and in particular fillers of the carbonate, hydroxide, silicate, sulphate type and similar mineral fillers.

The invention relates in particular to a method of treating mineral fillers of a specific grain size with the aid of treatment agents of the organic phosphate type, incorporating a de-agglomeration step, and optionally a selection step, with a view to improving the techniques used to manufacture polyurethane foams either by foaming without an auxiliary blowing agent or with a blowing agent such as $CO_2$, and composite polyurethane, whilst reducing the time needed to mix this treated filler treated with the polyol and other reagents.

Numerous applications for block foams or moulded foams, for mattresses and similar, the automotive industry, various industrial components, etc . . .

37 Claims, No Drawings

METHOD FOR PROCESSING A MINERAL FILLERS WITH A PHOSPHATE, SAID FILLERS AND THEIR USES

The present invention relates to the technological sector which manufactures polyurethane foams and more specifically to the mineral fillers used in this sector, in particular fillers of the carbonate, hydroxide, silicate and sulphate type and similar mineral fillers.

It is known that polyurethane foam (or PUR) is obtained by the reaction of a polyol on an isocyanate such as toluene diisocyanate or TDI, concurrently with a reaction of the isocyanate on water.

To produce block foam, the "mixing head" is charged either with a master batch of polyol and mineral additive on the one hand and on the other hand the remaining polyol, the catalyst system such as an amine catalyst, tin catalyst or any other catalyst, one or more surface active agents, generally of the silicon type, water, toluene diisocyanate, optionally an auxiliary foaming agent which may be methylene chloride, acetone and various additives such as heat stabilising agents or, alternatively, with the polyol in which the master batch has been diluted to the desired concentration beforehand and on the other the above-mentioned additives (catalyst, surface active agent, etc . . . ).

The reaction of the water on the isocyanate, catalysed by the amine, generates $CO_2$ which forms the foam.

In order to reduce the cost price per litre and per kilogram of objects made from flexible, semi-rigid or rigid polyurethane foam, which may or may not be moulded, it has become increasingly necessary to increase the quantity of filler contained in the flexible, semi-rigid or rigid polyurethane foams whilst conserving or improving their physical-chemical properties, such as compression modulus or tear strength, or improve their aesthetic or other qualities such as their fireproof qualities, a required by the different fields of industry such as the automotive, furniture, building and other industries.

These days, there are several methods of incorporating the mineral fillers with these polyurethane compounds.

In a first type of method (FR 2 651 236), calcium carbonate is introduced into a polyurethane plasticiser. This method of producing a suspension of filler in a plasticiser, which allows the proportion of filler in the polyurethane compound to be increased, has proved to be expensive and too awkward to implement when manufacturing flexible, semi-rigid or rigid polyurethane foams because of the accompanying deterioration in the physical and chemical properties of the foams obtained using this filler suspension.

Attempts were then made to introduce the mineral fillers to the flexible, semi-rigid or rigid polyurethane foams in a simpler, less costly manner, eliminating the inherent problem which causes a significant reduction in the reaction capacity of the polyurethane foams.

To this end, various methods of introducing the filler into a polyol, one of the ingredients of polyurethane, have become known to those skilled in the art.

A first type of method is based on a teaching of grafting methacrylic acid (DE 2 654 746, DE 2 714 291, DE 2 739 620) or another vinyl compound such as styrene onto the polyol. However, with this type of method the calcium carbonate suspension in the polyol becomes unworkable, being too difficult to handle due to a very high viscosity and a poor distribution of the filler in the medium in conjunction with problems caused by sedimentation of the suspension.

Another type of method consists in treating the surface of the filler before it is introduced into the polyol using an agent, which might be an alcohol with 8 to 14 carbon atoms for example (FR 2 531 971) or a phosphate of hydroxycarboxylic acid (EP 0 202 394).

However, these methods produce the same type of disadvantages as those outlined above because the user is faced with problems caused by the poor capacity of the mineral filler treated in this way to disperse in the polyol.

Another method of treating a mineral filler has been developed (EP 0 726 298) using at least one agent of the organic phosphate type for treatment purposes, in conjunction with a treated mineral filler, producing a suspension of mineral filler in the polyols which has a high filler content and a low viscosity, i.e. a homogeneous suspension which is not susceptible to sedimentation or to decantation, nor does it inherently thicken when manufacturing flexible, semi-rigid or rigid polyurethane foam.

According to this document, the mineral fillers are treated with a view to placing them in suspension in the polyols with the aid of at least one agent of the organic phosphate type for treatment purposes, having the general formula (1):

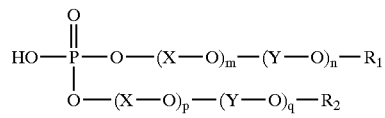

where $R_1$=either H or alkyl with 8 to 40 carbon atoms or aryl or alkylaryl or arylalkyl with 6 to 40 carbon atoms where $R_2$=either alkyl with 8 to 40 carbon atoms or aryl or alkylaryl or arylalkyl with 6 to 40 carbon atoms $X$=—$CH_2$—$CH_2$—

$Y$=$CH(CH_3)$—$CH_2$— or —$CH_2$—$CH(CH_3)$—

(m+n) varies from 0 to 30 where $m \leq 30$ and $n \leq 30$ (p+q) varies from 0 to 30 where $p \leq 30$ and $q \leq 30$.

This latter technique is satisfactory but a new problem has been encountered in connection with a specific and more recent technique of manufacture of PUR foams.

According to the conventional method, the mixer head is charged with a mixture of polyol and mineral filler on the one hand and the remaining polyol, TDI, an auxiliary foaming agent such as methylene chloride and various additives such as a tin salt and a surfactant, generally of the silicon type, on the other. The reaction generates $CO_2$ in situ, as mentioned above, which forms the foam. Formation of the foam passes through two main stages, the first occurring at the onset of foaming and the second when the foam block is being stabilised, after which a mass of PUR foam is produced which is then cut into blocks of the desired dimension in order to make mattresses, seat coverings, etc . . .

A new method has been developed in recent years and is described in particular in patents EP 0 645 226 and WO 96/00644, whereby the $CO_2$ is injected into the mixing head directly or through the polyol flow in the liquid state. The $CO_2$ is therefore used as an auxiliary blowing agent.

This method has advantages, particularly in terms of reducing in quite a remarkable way the use and formation of toxic or inflammable products and is likely to take on increasing importance in the future.

However, this new method does have technical problems in addition to those inherent in manufacturing PUR foam.

In order to implement a method of this type correctly, known as PUR foam with $CO_2$ or "$CO_2$ method", it seems to be necessary to reduce significantly the time needed to mix the filler with the polyol and to improve the mixing quality.

As proposed by this invention, it has been found that the problem of the mixing time and the difficulties inherent in the new $CO_2$ method can be resolved by treating a mineral filler in a manner comparable to the techniques described in EP 0 726 298, but with significant improvements.

Surprisingly, it was also discovered whilst conducting research into the $CO_2$ method that the method used to treat the mineral fillers as proposed by the invention also improves the conventional processes used to manufacture PUR foams.

Accordingly, the invention is not limited to the $CO_2$ processes, which was the original problem to be resolved, but on the contrary is applicable in a general manner.

It has also been found that the method proposed by the invention for treating mineral fillers can be applied to the methods used to manufacture composite materials with a PUR matrix, whether or not they are cellular, and that whatever the filler used: $CaCO_3$, talcs, kaolins, aluminium hydroxide, magnesium hydroxide, etc . . . in numerous applications in the field of accessories for the automotive industry, for the transport sector, in particular road or rail and for industrial objects used in a variety of applications.

By the terms "composite materials" or "composite PUR" used here is meant polyurethanes reinforced with vegetable fibres, glass or quartz or synthetic fibres, cut fibres in general, or similar. By the expression "cellular PUR" used here is meant polyurethanes, whether they are expanded or not.

The invention relates to a method of treating mineral fillers of a specific grain size with the aid of processing agents of the organic phosphate type, incorporating a de-agglomeration stage and optionally a selection stage, with a view to improving the techniques applied to manufacturing PUR foams either by foaming without an auxiliary blowing agent or foaming with an auxiliary blowing agent such as methylene chloride, acetone or $CO_2$ or others, and composite PURs, whilst reducing the time taken to mix the filler treated in this way, with the polyol and other reagents and overcoming the specific difficulties encountered with regard to the filler agglomerates which clog the static dispersing equipments provided for the $CO_2$ and which tend to detract from the mechanical properties of PUR foams and composites, cellular or not, such as the tear strength of PUR foams, for example.

More specifically, the invention relates to a method of treating mineral fillers, characterised in that the filler:

a) is treated using at least one compound of the general formula (1):

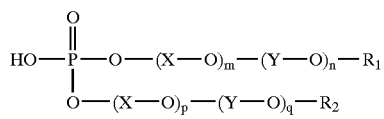

where $R_1$=either H or alkyl with 8 to 40 carbon atoms or aryl or alkylaryl or arylalkyl with 6 to 40 carbon atoms where $R_2$=either alkyl with 8 to 40 carbon atoms or aryl or alkylaryl or arylalkyl with 6 to 40 carbon atoms X=—$CH_2$—$CH_2$— or —$CH(CH_3)$—$CH_2$—or —$CH_2$—$CH(CH_3)$— or —$(CH_2)_5$—CO—

Y=—$CH_2$—$CH_2$— or —$CH(CH_3)$—$CH_2$—or —$CH_2$—$CH(CH_3)$— or —$(CH_2)_5$—CO—

X and Y being the same or different, (m+n) varies from 0 to 60 (boundaries included) as well as (p+q) where $0 \leq m+n \leq 60$ and $0 \leq p+q \leq 60$ when X=Y=—$CH_2$—$CH_2$—and where ($1 \leq m \leq 10$ and $1 \leq p \leq 10$) and ($0 \leq n \leq 59$ and $0 \leq q \leq 59$) if X is different from Y.

b) undergoes a de-agglomeration step and c) optionally undergoes a selection step.

Said filler is of a specific grain size as described below.

By the term "de-agglomeration" is meant a step whereby the number of agglomerates are reduced using an appropriate apparatus, of the crusher type, more specifically a crusher of the pin type or known "attritor" type. The agglomerates can be evaluated by a known method in accordance with the North gauge procedure, which is governed by a standard (ISO 1524).

By "selection" is meant the operation whereby a certain range within the grain size is separated by passage through "separators" (screens, dynamic classifiers, etc . . . which are known). An operation of this type does not affect the quality of the product but the skilled person will be able to decide whether to apply it or not as a means of optimising the product, depending on the anticipated end use.

By "specific grain size" for the purposes of the invention is meant that the grain size must be neither too fine nor too coarse and should be produced directly by crushing or by mixing fillers. In one illustrative but not restrictive example, given in order to provide an understanding of this criterion, the filler may substantially have a mean diameter of d50 in terms of grain size. This mean diameter for the mineral fillers proposed by the invention will be between 0.1 micrometres and 15 micrometres, preferably between 0.1 micrometres and 10 micrometres and most preferably between 0.3 and 8 micrometres. Furthermore, the person skilled in the art will know how to make up fillers which comply with this requirement.

The invention also relates to mineral fillers of a specific grain size treated with this treatment agent by a de-agglomeration step, and optionally a selection step, requiring a shorter time to mix the filler thus treated with the polyol and other reagents and intended to be placed in suspension in a polyol with a view to use in the manufacture of polyurethane foams either by foaming without an auxiliary blowing agent or foaming with an auxiliary blowing agent such as methylene chloride, acetone or $CO_2$ or others, or composite PURs, and more specifically mineral fillers of the carbonate type treated by this method and for this purpose.

The invention also relates to suspensions in the polyols of the mineral fillers so treated, prepared so that they can be incorporated in a method of manufacturing PUR foams either by foaming without an auxiliary blowing agent or foaming with an auxiliary blowing agent such as methylene chloride, acetone or $CO_2$ or others, as well as their use in the manufacture of flexible, semi-rigid or rigid polyurethane foams by the method either by foaming without an auxiliary blowing agent or foaming with an auxiliary blowing agent such as methylene chloride, acetone or $CO_2$ or others and for the manufacture of composite polyurethanes.

In addition, the invention relates to the actual foams obtained by a method involving either by foaming without an auxiliary blowing agent or foaming with an auxiliary blowing agent such as methylene chloride, acetone or $CO_2$ or others, or composite polyurethanes, cellular or not, containing the fillers treated by the method of the invention in a mixture with polyol.

Furthermore, the invention relates to the use of flexible, semi-rigid or rigid polyurethane foams or composites, cellular or not, thus obtained for the manufacture of moulded or non-moulded objects.

The invention also relates to the preliminary mixtures with a polyol of the fillers treated by the method of the invention and in particular in proportions appropriate to the manufacture of polyurethanes and more specifically polyurethane foams or composite PURs.

In a preferred embodiment of the invention, the filler will be used immediately it leaves the manufacturing equipment, the moisture content of which will be compatible with its application.

Most preferably, the mineral filler will be treated with an acid phosphate of aliphatic alcohol, branched or not, with 8 to 20 carbon atoms, onto which 0 to 12 ethylene oxide chains are condensed, and may optionally contain a mixture of mono-esters and di-esters.

The treatment proposed by the invention is implemented dry or wet.

The mineral fillers treated as proposed by the invention and which enable stable and homogeneous suspensions to be obtained in the polyols are selected from among the mineral fillers which impart to polyurethane foams and PURs used to make up composites with a PUR matrix, cellular or not, physical and chemical properties that are compatible with the use to which these products will be put when manufacturing objects, moulded or not, and are selected in particular from among the carbonates, phosphates and sulphates of natural or synthetic alkaline earths such as, in particular, calcium carbonates of natural or synthetic origin, magnesium carbonate, zinc carbonate, the combined salts of magnesium and calcium such as dolomites, lime, magnesia, barium sulphate, calcium sulphates, magnesium hydroxides, aluminium hydroxides, silica, wollastonite, the clays and other silico-alumina such as the kaolins, silica-magnesia such as talc, mica, solid or hollow glass beads, the metal oxides such as zinc oxide, the iron oxides, titanium oxide and more specifically selected from among the natural or precipitated calcium carbonates such as chalk, calcite, marble, the dolomites, aluminum hydroxide, magnesium hydroxide, talc or mixtures thereof.

The mineral fillers proposed by the invention are distinctive compared with those of the prior art due to the fact that they retain their hydrophilic properties and exhibit an up-take of polyol which is reduced by at least 15% and preferably at least 20% as compared with an untreated mineral filler and more specifically the fact that they are obtained by the method of the invention.

By "preferably" is meant that the invention also covers the values of between 15% and 20% although the effectiveness of the results is better the greater the decrease in polyol take-up.

By definition, the polyol take-up, which represents the absorption capacity of the fillers, is the number of milligrams or grams of polyol used for 100 g or 100 ml of filler substance under the test measurement conditions stipulated by a method based on the ISO 787/5 standard.

The polyols used belong to the family of polyethers and polyesters-polyethers and the polyesters.

Amongst the common polyol polyethers, mention may be made, for example, of the addition products of propylene oxide on a simple polyol such as, for example, glycol, glycerol, trimethylolpropane, sorbitol, in the presence of ethylene oxide or not. However, mention may also be made of the special polyol polyethers such as, for example, the amine-based polyethers obtained by the addition of propylene oxide or optionally ethylene oxide on amines, halogen polyethers, grafted polyethers resulting from the copolymerisation of styrene and acrylonitrile in suspension in a polyether, or alternatively polytetramethylene glycol.

Amongst the polyol polyesters, mentioned may be made, for example, of those resulting from the polycondensation of polyalcohols on polyacids or their anhydrides, such as the diacids, such as, for example, adipic, phthalic or other diacids, reacting with diols (for example ethylene glycol, propylene glycol, butylene glycol or others), triols (for example glycerol, trimethylolpropane or others) and tetrols (for example pentaerythritol or others, alone or in a mixture).

Other polyols which may also be mentioned are various hydroxyl compounds such as, for example, hydroxylated polybutadienes, the prepolymers with hydroxyl terminations (resulting from the reaction of excess polyol on a diisocyanate) or the simple polyols such as, for example, glycerol, amino alcohols used in a small quantity with the polyol polyethers or the polyol polyesters in order to increase cross-linking.

The suspensions of mineral fillers in the polyols, as proposed by the invention, which may also contain other mineral and/or organic products such as catalysts and/or anti-oxidants and/or others, are characterised in that the concentration of dry substance of the treated mineral substances may be as high as 80% by weight, and in that they are not susceptible either to decantation or sedimentation or damning thickening after storage for 7 days in readiness for the manufacture of flexible, semi-rigid or rigid polyurethane foams, i.e. having a stable apparent Brookfield viscosity which is lower than that of suspensions of mineral fillers which have not been treated and in that they contain 0.5% to 3% by weight, relative to the weight of the mineral filler, of at least one treatment agent having the general formula (1).

An additional objective of the invention is to produce homogenous, stable and low-viscosity suspensions of these treated mineral fillers in the polyols, characterised by a concentration by weight of mineral fillers which may be as high as 80% and a content of treatment agent which may range from 0.5% to 3% by weight relative to the dry weight of the filler and containing no agglomerates.

These homogeneous, stable, low-viscosity suspensions proposed by the invention are easy to handle because they do not exhibit, under the normal conditions in which they are used by the skilled person, any occurrence of decantation, i.e. the separation in two phases, of sedimentation, i.e. the presence of a hard deposit at the bottom of the tank in which the suspension is stored, nor is there any damning thickening, which means that it will be possible to produce flexible, semi-rigid or rigid polyurethane foams or composite PURs, cellular or not, with excellent physical and chemical properties.

Finally, another objective of the invention is the use of these homogeneous, stable and low-viscosity dispersions of mineral fillers for the manufacture of flexible, semi-rigid or rigid polyurethane foams or cellular or non-cellular composites as well as the use of these foams or these composites for the manufacture of objects which may or may not be moulded.

The homogeneous, stable and low-viscosity suspensions filled in this manner, as proposed by the invention, exhibit a specific feature in that they can be used for the manufacture of polyurethane foams, regardless of whether they are flexible, semi-rigid or rigid, or for the manufacture of polyurethane composites, which may be cellular or not.

Furthermore, the flexible, semi-rigid or rigid polyurethane foams, cellular or not, obtained by using the suspensions of mineral fillers, treated as proposed by the invention, in polyols are used to make objects which may or may not be moulded.

Other features and advantages of the invention will become clear from the description given below.

The scope and interest of the invention will be more readily appreciated from the examples given below, although these are not intended to be restrictive in any respect.

EXAMPLE 1

A. Tests for Preparing Various Treated Fillers

To this end, tests No. 1 to 10 were conducted using three different filler bases and a treatment agent of the phosphate type, referred to as "AGT" hereafter, as set out in the various tables.

Tests No. 1 to 4

These tests illustrate the invention and are conducted using a treatment agent which is a mixture of mono-ester and di-ester of acid phosphate of decyl alcohol having 5 mols of ethylene oxide, using as the filler a Champagne chalk having an average diameter of 2 micrometres (product A).

Test No. 1

For this test, the treated filler was made in accordance with the method proposed by the invention by introducing the agent proposed by the invention (AGT) simultaneously with the de-agglomeration operation into a pin mill, followed by a fine selection process using a 24-dynamic classifier.

Test No. 2

For this test, the treated filler was made using the method proposed by the invention by introducing the agent proposed by the invention (AGT) prior to the de-agglomeration and selection operation described in test No. 1.

Test No. 3

For this test, the treated filler was made in accordance with the method proposed by the invention by introducing the agent proposed by the invention (AGT) prior to the de-agglomeration operation into a pin mill, followed by a fine selection process using a 16-dynamic classifier.

Test No. 4

For this test, the treated filler was made using the method proposed by the invention by introducing the agent proposed by the invention (AGT) into a pin mill prior to the de-agglomeration operation, dispensing with the selection operation.

Tests No. 5 to 7

These tests illustrate the invention and are conducted using as a treatment agent a mixture of mono-ester and di-ester of acid phosphate of decyl alcohol with 5 mols of ethylene oxide and, as the filler, a calcite with an average diameter of 1.8 micrometres (product B).

Test No. 5

For this test of the invention, the same method was used to make the treated filler of the invention as that used for test No. 4.

Test No. 6

For this test of the invention, the same method was used to make the treated filler of the invention as that used for test No. 2.

Test No. 7

For this test of the invention, the same method was used to make the treated filler of the invention as that used for test No. 1.

Test No. 8

This test illustrates the prior art and the treatment agent used is a mixture of mono-ester and di-ester of acid phosphate of decyl alcohol with 5 mols of ethylene oxide and a Champagne chalk with an average diameter of 2.4 micrometres (product C) as the filler.

To this end, 3 kg of product C (chalk) and 30 g of AGT are introduced into a laboratory ball mill having a 15 l capacity and containing 9 kg of crushing medium and the mixture is crushed for 4 hours to obtain the grain size of product A, without carrying out the de-agglomeration step.

Test No. 9

This test illustrates the invention and the treatment agent used is a mixture of mono-ester and di-ester of acid phosphate of decyl alcohol with 5 mols of ethylene oxide and a Champagne chalk with an average diameter of 2.4 micrometres (product C) as the filler.

To this end, 3 kg of product C are mixed with 1.6 kg of water and 30 g of AGT and this "slurry" is introduced into a laboratory ball mill having a 15 l capacity and containing 9 kg of crushing medium, followed by crushing for 8 hours to obtain the desired grain size, followed by drying, de-agglomeration and selection using a 24-dynamic laboratory classifier.

Test No. 10

This test illustrates the invention and the agent used is a mono-ester of acid phosphate of tristyrylphenol containing 60 mols of ethylene oxide and the filler used is a calcite with an average diameter of 1.8 micrometres (product B).

For this test of the invention, the same method was used to make the treated filler of the invention as that used for test No. 1.

The results of tests 1 to 4 and 5 to 7 are set out in Table I and those of tests 8 to 10 in Table II.

TABLE I

| CHARACTERISTICS TEST No. | Invention 1 | Invention 2 | Invention 3 | Invention 4 |
|---|---|---|---|---|
| FILLER PRODUCT | Product A | Product A | Product A | Product A |
| FEED RATE | 700 kg/h | 700 kg/h | 700 kg/h | 700 kg/h |
| TREATMENT RATE | 1% | 1% | 1% | 1% |
| SEPARATOR/FINS | 24 | 24 | 16 | No selector |
|  | De-agglomeration simultaneous with injection of AGT agent + Selection | AGT agent injected prior to de-agglomeration + Selection | Reduced efficiency of the selector as compared with test No. 2 | De-agglomeration without selection |

| CHARACTERISTICS TEST No. | Invention 5 | Invention 6 | Invention 7 |
|---|---|---|---|
| FILLER PRODUCT | Product B | Product B | Product B |
| FEED RATE | 700 kg/h | 700 kg/h | 700 kg/h |
| TREATMENT RATE | 1% | 1% | 1% |
| SEPARATOR/FINS | without selector De-agglomeration without selection | 24 AGT agent injected prior to de-agglomeration + selection | 24 De-agglomeration simultaneous with injection of AGT agent + selection |

TABLE II

| CHARACTERISTICS TEST No. | Prior art 8 | Invention 9 | Invention 10 |
|---|---|---|---|
| FILLER PRODUCT | Product C Dry method | Product C Wet method | Product B Dry method |
| FEED RATE | — | 1 kg/h | 400 kg/h |
| TREATMENT RATE | 1% | 1% | 1% |
| SEPARATOR/ | without selec- | 24 | 24 |

TABLE II-continued

| CHARACTERISTICS TEST No. | Prior art 8 | Invention 9 | Invention 10 |
|---|---|---|---|
| FINS | tor Treatment and crushing without de-agglomeration nor selection | Treatment and crushing by wet method with de-agglomeration and selection | De-agglomeration simultaneous with injection of AGT agent + selection |

The fillers treated in this manner, as well as the other fillers, whether treated or not, are used for the tests described below, which illustrate how they are dispersed in a polyol in order to simulate the speed and ease with which the filler is dispersed in this polyol.

B. Tests Showing Dispersion in a Polyol

To this end, 250 g of a triol with a hydroxyl index equal to 48 mg/g and a viscosity of 750 mPa.s are weighed out and placed in a metal container of a height of 105 mm and a diameter of 90 mm and are then placed under agitation using an agitator of the Pendraulik brand fitted with a de-flocculating blade having a diameter of 50 mm and a speed regulator. The rotation speed of the agitation shaft was checked with a tachymeter (380 or 690 r/min.) 25 g of mineral were introduced into the polyol and the timer started immediately all the powder is introduced. Samples of 2 or 3 g of dispersion are taken at regular intervals using a Pasteur pipette. The sample is applied to the North gauge (0 to 100 μm) and the measurement taken as described in ISO standard 1524. The gauge reading used is the value on the scale at which the first point of non-dispersed mineral appears. The North gauge is cleaned with isopropyl alcohol and dried between each test.

In each of tests No. 11 to 28, the polyol used is described in Tables III-1, III-2 and III-3 below, which set out the results.

TABLE III-1

|  | Test 11 REFERENCE | Test 12 INVENTION | Test 13 PRIOR ART | Test 14 PRIOR ART | Test 15 PRIOR ART | Test 16 REFERENCE | Test 17 PRIOR ART |
|---|---|---|---|---|---|---|---|
| Filler type | Product A | Product A | Product D | Product A + 0.5114% AGT | Product A + 0.4742% AGT | Product A | Product D |
| Filler quantity | 25 g | 25 g | 25 g | 25 g | 25 g | 25 g | 25 g |
| Polyol type | IOH 48 Visco 750 | IOH 48 Visco 750 | IOH 48 Visco 750 | IOH 48 Visco 750 | IOH 48 Visco 750 | IOH 48 Visco 750 | IOH 48 Visco 750 |
| Polyol quantity | 250 g | 250 g | 250 g | 250 g | 250 g | 250 g | 250 g |
| Mixing speed | 380 r./min. | 380 r./min. | 380 r./min. | 380 r./min. | 690 r./min. | 690 r./min. | 690 r./min. |
| Gauge after 2 min | 0 | 0 | 0 | 0 | 0 | 0 | / |
| Gauge after 5 min | 0 | 0.5 | 0 | 0 | 0 | 0 | 1 |
| Gauge after 8 min | 0 | 4.5 | 0 | 0 | 0 | 1 | 1 |
| Gauge after 10 min | 0 | / | 0 | 0 | 0 | 1 | 1.5 |
| Gauge after 12 min | / | 7 | 0 | 0 | 0 | 1 | 2 |
| Gauge after 15 min | / | / | / | / | / | 1 | 1.5 |
| Gauge after 18 min | / | / | / | / | / | 2 | 1 |
| Gauge after 20 min | / | / | / | / | / | 2.5 | 2 |
| Gauge after 22 min | / | / | / | / | / | 3 | 3 |
| Gauge after 24 min | / | / | / | / | / | 3.5 | / |
| Gauge after 25 min | / | / | / | / | / | / | 3 |
| Gauge after 26 min | / | / | / | / | / | 3.5 | / |
| Gauge after 28 min | / | / | / | / | / | 4.5 | 2 |
| Gauge after 30 min | / | / | / | / | / | 4.5 | 2 |
| Gauge after 32 min | / | / | / | / | / | 5 | / |
| Gauge after 35 min | / | / | / | / | / | / | / |

TABLE III-2

|  | Test 18 PRIOR ART | Test 19 PRIOR ART | Test 20 INVENTION | Test 21 INVENTION | Test 22 INVENTION | Test 23 INVENTION | Test 24 INVENTION | Test 25 PRIOR ART |
|---|---|---|---|---|---|---|---|---|
| Filler type | Product A + GUEDU | Product B + GUEDU | Product Test 1 | Product Test 2 | Product Test 3 | Product Test 4 | Product Test 5 | Product Test 8 |
| Filler quantity | 25 g | 25 g | 25 g | 259 | 25 g | 25 g | 25 g | 25 g |
| Polyol type | IOH 48 Visco 750 | IOH 48 Visco 750 | IOH 48 Visco 750 | IOH 48 Visco 750 | IOH 48 Visco 750 | IOH 48 Visco 750 | IOH 48 Visco 750 | IOH 48 Visco 750 |
| Polyol quantity | 250 g | 250 g | 250 g | 250 g | 250 g | 250 g | 250 g | 250 g |
| Mixing speed | 380 r./min. | 380 r./min. | 690 r./min. | 690 r./min. | 690 r./min. | 690 r./min. | 690 r./min. | 690 r./min. |
| Gauge after 2 min | 0 | 0 | 0.5 | / | / | / | / | / |
| Gauge after 5 min | 0 | 0 | 4.5 | 1.5 | 4 | 1.5 | 2.5 | 0 |
| Gauge after 8 min | 0 | 0 | 2 | / | / | / | / | / |
| Gauge after 10 min | 0 | 0 | 2 | 3.5 | 5 | 3 | 4 | 0 |
| Gauge after 12 min | 0 | 0 | 3 | / | / | / | / | / |
| Gauge after 15 min | 0 | 0 | 6 | 4 | 3.5 | 3.5 | 4 | 0 |
| Gauge after 18 min | / | / | / | / | / | / | / | / |
| Gauge after 20 min | / | 0 | 3 | 2 | 4 | 3.5 | 3 | 0 |
| Gauge after 22 min | / | / | / | / | / | / | / | / |
| Gauge after 24 min | / | / | / | / | / | / | / | / |
| Gauge after 25 min | / | / | 5.5 | 3 | 4 | 3.5 | 2.5 | 0 |
| Gauge after 26 min | / | / | / | / | / | / | / | / |
| Gauge after 28 min | / | / | / | / | / | / | / | / |

TABLE III-2-continued

|  | Test 18 PRIOR ART | Test 19 PRIOR ART | Test 20 INVENTION | Test 21 INVENTION | Test 22 INVENTION | Test 23 INVENTION | Test 24 INVENTION | Test 25 PRIOR ART |
|---|---|---|---|---|---|---|---|---|
| Gauge after 30 min | / | / | 6 | 2 | 4.5 | 3.5 | 2.5 | 0 |
| Gauge after 32 min | / | / | / | / | / | / | / | / |
| Gauge after 35 min | / | / | / | / | / | / | / | / |

TABLE III-3

|  | Test 26 INVENTION | Test 27 INVENTION | Test 28 INVENTION |
|---|---|---|---|
| Filler type | Product Test 9 | Product Test 10 | Product B + 1% AGT |
| Filler quantity | 25 g | 25 g | 25 g |
| Polyol type | IOH 48 Visco 750 | IOH 48 Visco 750 | IOH 48 Visco 750 |
| Polyol quantity | 250 g | 250 g | 250 g |
| Mixing speed | 690 r./min. | 690 r./min. | 690 r./min. |
| Gauge after 2 min | / | 2.5 | 4 |
| Gauge after 5 min | 0 | 3 | 4.5 |
| Gauge after 8 min | / | / | / |
| Gauge after 10 min | 2 | / | 5 |
| Gauge after 12 min | / | / | / |
| Gauge after 15 min | 3 | / | 5 |
| Gauge after 18 min | / | 3.5 | / |
| Gauge after 20 min | 2 | / | 5 |
| Gauge after 22 min | / | / | / |
| Gauge after 24 min | / | / | / |
| Gauge after 25 min | 3 | / | / |
| Gauge after 26 min | / | / | / |
| Gauge after 28 min | / | / | / |
| Gauge after 30 min | 2 | / | / |
| Gauge after 32 min | / | / | / |
| Gauge after 35 min | / | / | / |

In these tables, AGT refers to the agent of the phosphate type proposed by the invention, GUEDU the known mixer and IOH the hydroxyl index.

Test No. 11

This test illustrates the dispersion of a Champagne chalk of an average diameter of 2 micrometres, not treated, in the above-mentioned polyol.

There is no gauge reading and therefore none of the mixing performed is homogeneous and without agglomerates.

The result is poor; this is a reference test.

Test No. 12

This test represents an example of the invention using Product A from test No. 1. The gauge reading is 4.5 after 8 minutes.

Accordingly, mixing is good after 8 minutes.

Test No. 13

This test represents the prior art and a Champagne chalk is used, simply treated with stearic acid and having an average diameter of 2 micrometres and commercially available (Product D).

The result is poor.

Test No. 14

This test illustrates the addition of the treatment agent used for tests 1 to 9, not for treating the filler as in tests No. 1 to 9 but as a dispersing agent, since it is added to the filler-polyol mixture.

The results are poor and confirm the importance of performing the treatment proposed by one of the steps of the invention.

Test No. 15

This test is identical to test No. 14 except for the quantity of agent (very little) and the agitation speed used to form the mixture (almost double) in order to supply greater dispersion energy.

The result is also poor.

Test No. 16

This test is identical to No. 11 except for the agitation speed used to form the mixture (almost double), which shows that more than 20 minutes are needed in order to produce a good mixture (gauge=3), hence requiring much more mechanical energy.

Test No. 17

This test is identical to No. 13 except for the agitation speed used to form the mixture (almost double), which shows that more than 20 minutes are needed in order to produce a good mixture (gauge=3), hence requiring much more mechanical energy.

Tests No. 18 and 19

These tests use a simple mixer of the Guedu type and produce poor results, proving that the treatment performed in accordance with the steps of the invention is not one of simple mixing.

Test No. 18

This test is conducted with an untreated Champagne chalk of an average diameter of 2 micrometres. The mixing process in the Guedu mixer is performed using a treatment agent of the mono-ester and di-ester of nonylphenol phosphate type containing 30 ethylene oxide chains.

Test No. 19

This test is conducted with an untreated calcite of an average diameter of 1.8 micrometres. The mixing process in the Guedu mixer is performed using a treatment agent of the mono-ester and di-ester of acid phosphate of decyl alcohol type containing 5 ethylene oxide chains.

Tests No. 20 to 23

These tests respectively show the use of the test products No. 1 to 4 and are variations of the method proposed by the invention, demonstrating that de-agglomeration is sufficient and selection is not compulsory.

Test No. 24

This test illustrating the invention is conducted using calcite instead of chalk (the product of test No. 5 is used).

The result (gauge=4 after 10 minutes) can be regarded as good.

Test No. 25

This test uses the product of test No. 8 of the prior art and shows that crushing in the ball mill without de-agglomeration does not produce satisfactory results.

Test No. 26

This test uses the product of test No. 9 and gives suitable results (gauge=3 after 15 minutes); this test demonstrates the possibility of using a treatment proposed by the invention with the wet method.

Test No. 27

This test uses the product of test No. 10 and gives suitable results (gauge=3 after 5 minutes); this test is an example of what happens when an agent of a different type proposed by the invention is used.

Test No. 28

This tests uses a calcite (product B) treated by the method proposed by the invention for test No. 1, using 1% by weight of a mixture of acid phosphate mono-ester and di-ester of ketostearylic alcohol.

This test produces suitable results (gauge=4 after 2 minutes) and is an example showing the use of an agent of a different type proposed by the invention.

EXAMPLE 2

This example relates to the use of different fillers, all treated using the method of test No. 1.

The following are the different fillers that were used:

Product R: marble with an average diameter of 8 micrometres,

Product S: commercial magnesium hydroxide with an average diameter of 1.4–1.8 micrometres, Product T: talc with an average diameter of 2.5 micrometres, Product U: dolomite with an average diameter of 3 micrometres, Product V: aluminium hydroxide with an average diameter of 0.8 micrometres, Product G: kaolin with an average diameter of 0.50 micrometres, Product W: precipitated calcium carbonate with an average diameter of 0.3 micrometres.

Test No. 29

This test is a reference test representing an untreated kaolin with an average diameter of 0.50 micrometres, dispersed in the above-mentioned polyol.

There was no gauge reading and therefore no mixture was formed that was homogeneous and without agglomerates. The result was poor.

Test No. 30

This test is a test of the invention, based on the method of test No. 1, using a kaolin of an average diameter of 0.50 micrometres treated with 1.5% by weight of the agent used in test No. 1.

The gauge reading is good compared with the reference test.

Test No. 31

This is a reference test conducted with product U. There was no gauge reading.

Test No. 32

This is a test of the invention, conducted on treated product U, using the method of test No. 1, with 1.5% by weight of the agent used in test No. 1. The gauge reading was good compared with the reference test.

Test No. 33

This test is a reference test with product W. There is no gauge reading.

Test No. 34

This is a test of the invention, conducted on treated product W, using the method of test No. 1, with 2.5% by weight of the agent used in test No. 1. The gauge reading was good compared with the reference test.

Test No. 35

This test is a reference test conducted on product R. There is no gauge reading.

Test No. 36

This is a test of the invention, conducted on treated product R, using the method of test No. 1, with 1% by weight of the agent which is an acid phosphate mono-ester and di-ester of nonylphenol containing 10 mols of ethylene oxide. The gauge reading was good compared with the reference test.

Test No. 37

This test is a reference test conducted on a mixture (product A+product T) with an average diameter of 2.5 micrometres in a ratio of 50/50 by weight. There is no gauge reading.

Test No. 38

This is a test of the invention, conducted on the treated product used in test No. 37, using the method of test No. 1, with 0.5% of the agent used in test No. 1. The gauge reading was good compared with the reference test.

Test No. 39

This test is a reference test conducted on product V. There is no gauge reading.

Test No. 40

This is a test of the invention, conducted on treated product V, using the method of test No. 1, with 1.2% of the agent used in test No. 1. The gauge reading was good compared with the reference test.

Test No. 41

This is a reference test on product S. There is no gauge reading.

Test No. 42

This is a test of the invention, conducted on treated product S, using the method of test No. 1, with 1.5‰ of the agent used in test No. 1. The gauge reading was good compared with the reference test.

The results are set out in Tables IV-1 and IV-2 below.

TABLE IV-1

| | Test 29 REFERENCE | Test 30 INVENTION | Test 31 REFERENCE | Test 32 INVENTION | Test 33 REFERENCE | Test 34 INVENTION |
|---|---|---|---|---|---|---|
| Filler type | Product G | Product G + 1.5% AGT | Product U | Product U + 1.5% AGT | Product W | Product W + 2.5% AGT |
| Filler quantity | 25 g | 259 | 25 g | 25 g | 25 g | 25 g |
| Polyol type | IOH 48 Visco 750 | IOH 48 Visco 750 | IOH 48 Visco 750 | IOH 48 Visco 750 | IOH 48 Visco 750 | IOH 48 Visco 750 |
| Polyol quantity | 250 g | 250 g | 250 g | 250 g | 250 g | 250 g |
| Mixing speed | 690 r./min. | 690 r./min. | 690 r./min. | 690 r./min. | 690 r./min. | 690 r./min. |
| Gauge after 2 min | 0 | 0 | 0 | 1 | 0 | 4 |
| Gauge after 5 min | 0 | 1 | 0 | 2 | 0 | 4 |
| Gauge after 8 min | 0 | 2 | 0 | / | 0 | 4.5 |
| Gauge after 10 min | 0 | 2 | 0 | 3 | 0 | 5 |
| Gauge after 12 min | 0 | 2 | 0 | / | 0 | 6 |
| Gauge after 15 min | 0 | 3 | 0 | 3 | 0 | 6 |
| Gauge after 18 min | 0 | 3.5 | 0 | / | 0 | 6 |
| Gauge after 20 min | 0 | 3 | 0 | 4 | 0 | 7 |
| Gauge after 22 min | / | 3.5 | / | / | / | / |
| Gauge after 24 min | / | 3 | / | / | / | / |
| Gauge after 25 min | / | 3 | / | 4 | / | 7 |
| Gauge after 26 min | / | / | / | / | / | / |
| Gauge after 28 min | / | / | / | / | / | / |

TABLE IV-1-continued

|  | Test 29 REFERENCE | Test 30 INVENTION | Test 31 REFERENCE | Test 32 INVENTION | Test 33 REFERENCE | Test 34 INVENTION |
|---|---|---|---|---|---|---|
| Gauge after 30 min | / | / | / | / | / | / |
| Gauge after 32 min | / | / | / | / | / | / |
| Gauge after 35 min | / | / | / | / | / | / |

TABLE IV-2

|  | Test 35 REFERENCE | Test 36 INVENTION | Test 37 REFERENCE | Test 38 INVENTION | Test 39 REFERENCE | Test 40 INVENTION | Test 41 REFERENCE | Test 42 INVENTION |
|---|---|---|---|---|---|---|---|---|
| Filler type | Product R | Product R + 1% NP1OP04 | Product A + Product T | Product Test 37 + 0.5% AGT | Product V | Product V + 1.2% AGT | Product S | Product S + 1,5% AGT |
| Filler quantity | 25 g | 25 g | 25 g | 25 g | 25 g | 25 g | 25 g | 25 g |
| Polyol type | IOH 48 Visco 750 | IOH 48 Visco 750 | IOH 48 Visco 750 | IOH 48 Visco 750 | IOH 48 Visco 750 | IOH 48 Visco 750 | IOH 48 Visco 750 | IOH 48 Visco 750 |
| Polyol quantity | 250 g | 250 g | 250 g | 250 g | 250 g | 250 g | 250 g | 250 g |
| Mixing speed | 690 r./min. | 690 r./min. | 690 r./min. | 690 r./min. | 690 r./min. | 690 r./min. | 690 r./min. | 690 r./min. |
| Gauge after 2 min | 0 | 3 | 0 | 4 | 0 | 5 | 0 | 5 |
| Gauge after 5 min | 0 | 3 | 0 | 4.5 | 0 | 5 | 0 | / |
| Gauge after 8 min | 0 | 3.5 | 0 | / | 0 | 6 | 0 | 5 |
| Gauge after 10 min | 0 | 3.5 | 0 | / | 0 | 6 | 0 | / |
| Gauge after 12 min | 0 | 3.5 | 0 | / | 0 | / | 0 | 6 |
| Gauge after 15 min | 0 | 3 | 0 | 6.5 | 0 | / | 0 | / |
| Gauge after 18 min | 1 | 3.5 | 0 | 7 | 0 | / | 0 | 7 |
| Gauge after 20 min | 1 | 3 | 0 | / | 0 | 6 | 0 | 7 |
| Gauge after 22 min | 1 | / | / | / | / | / | / | 6.5 |
| Gauge after 24 min | 1 | / | / | / | / | / | / | / |
| Gauge after 25 min | 1 | / | / | / | / | / | / | / |
| Gauge after 26 min | / | / | / | / | / | / | / | / |
| Gauge after 28 min | / | / | / | / | / | / | / | / |
| Gauge after 30 min | / | / | / | / | / | / | / | / |
| Gauge after 32 min | / | / | / | / | / | / | / | / |
| Gauge after 35 min | / | / | / | / | / | / | / | / |

A review of Tables IV shows that the method proposed by the invention enables suspensions of various mineral fillers in a polyol to be obtained which are homogeneous and contain particles of less than 70 micrometres after 15 minutes.

EXAMPLE 3

This example relates to the manufacture of preliminary mixtures of mineral fillers with a polyol using different quantities of filler.

Test No. 43

This test illustrates the invention and uses product A as a filler treated as in test No. 1 and, as a polyol, a polyol with a hydroxyl index of 48 mg/g and a viscosity of 700 mPa.s at 200° C. in a ratio by weight of 60% polyol—40% calcium carbonate.

Test No. 44

This test illustrates the invention and uses product A as a filler treated as in test No. 1 and, as a polyol, a polyol with a hydroxyl index of 48 mg/g and a viscosity of 700 mPa.s at 200° C. in a ratio by weight of 50% polyol—50% calcium carbonate.

Test No. 45

This test illustrates the invention and uses product A as a filler treated as in test No. 1 and, as a polyol, a polyol with a hydroxyl index of 48 mg/g and a viscosity of 700 mPa.s at 200° C. in a ratio by weight of 40% polyol—60% calcium carbonate.

Test No. 46

This test illustrates the invention and uses product A as a filler treated as in test No. 1 and, as a polyol, a polyol with a hydroxyl index of 48 mg/g and a viscosity of 700 mPa.s at 200° C. in a ratio by weight of 90% polyol—10% calcium carbonate.

Test No. 47

This test illustrates the invention and uses kaolin as a filler treated as in test No. 30 and, as a polyol, a polyol with a hydroxyl index of 56 mg/g and a viscosity of 300 mPa.s at 250° C. in a ratio by weight of 50% polyol—50% kaolin.

The results are set out in Table V below.

TABLE V

|  | INVENTION Test 43 | INVENTION Test 44 | INVENTION Test 45 | INVENTION Test 46 | INVENTION Test 47 |
|---|---|---|---|---|---|
| Polyol | IOH = 48 Viscosity = 700 | IOH = 48 Viscosity = 700 | IOH = 48 Viscosity = 700 | IOH = 48 Viscosity = 700 | IOH = 56 Viscosity = 300 |
| Quantity (% weight) | 60 | 50 | 40 | 90 | 50 |
| Filler | Treated product Test No. 1 | Treated product Test No. 1 | Treated product Test No. 1 | Treated product Test No. 1 | Treated product Test No. 30 |
| Quantity (% of dry weight of filler) | 40 | 50 | 60 | 10 | 50 |

TABLE V-continued

|  |  | INVENTION Test 43 | INVENTION Test 44 | INVENTION Test 45 | INVENTION Test 46 | INVENTION Test 47 |
|---|---|---|---|---|---|---|
| Dispersant type |  | Agent Test No. 1 | Agent Test No. 1 | Agent Test No. 1 | Agent Test No. 1 | Agent Test No. 1 |
| Quantity (% of dry weight of filler) |  | 1 | 1 | 1 | 1 | 1 |
| Brookfield viscosities after 2 hours (mPa.s) at 23° C. | 10 r/min 100 r/min | 5250 2430 | 6500 3450 | 29800 9600 | 750 720 | 44160 17630 |
| Brookfield viscosities after 24 hours (mPa.s) at 23° C. | 10 r/min 100 r/min | 5000 2350 | 6350 3500 | 28700 9900 | 750 720 | 40000 22170 |
| Stability 7 days |  | NO DECANTATION, NO SEDIMENTATION, NO THICKENING |||||

A review of Table V shows that it is possible to obtain suspensions of mineral fillers in polyols which are not susceptible to decantation or sedimentation or to damning thickening.

EXAMPLE 4

This example illustrates how a PUR foam containing the fillers treated in accordance with the invention are obtained.

A known process is used to make PUR foam, using a preliminary mixture of filler treated as described in example 3 (test No. 44 with 50% calcium carbonate) in differing PUR foam densities and differing proportions of filler proposed by the invention.

Test No. 48

For this test, the anticipated density is 25 kg/M³ and the quantity of filler is 10 parts relative to the polyol.

Test No. 49

For this test, the anticipated density is 35 kg/m³ and the quantity of filler is 20 parts relative to the polyol.

Test No. 50

For this test, the anticipated density is 40 kg/m³ and the quantity of filler is 5 parts relative to the polyol.

The results are set out in Table VI below.

TABLE VI

| TEST No. | 48 | 49 | 50 |
|---|---|---|---|
| Polyol (IOH = 48) | 100 | 100 | 100 |
| Treated filler of test No. 1 | 10 | 20 | 5 |
| Amine catalyst | 0.15 | 0.18 | 0.39 |
| Tin octoate | 0.22 | 0.24 | 0.19 |
| Silicon-based surfactant | 0.8 | 0.8 | 0.8 |
| Water | 4.6 | 4.1 | 2.5 |
| TDI (isomer 80 ortho-20 para) | 56.2 | 51 | 34.5 |
| *Isocyanate index | 108 | 108 | 108 |
| *Slurry time | 17.3 | 18 | 22 |
| *Rise time | 92 | 100 | 140 |
| Density | 26 | 29.8 | 40 |

*Isocyanate index = $\frac{\text{number of NCO functions}}{\text{number of OH functions}} \times 100$

*Slurry time = Onset of foam formation = appearance time

*Rise time = Total time from the reaction whereby the foam is manufactured to stabilisation A review of Table VI shows that it is possible to obtain PUR foams by a method incorporating the improvement proposed by the present invention.

What is claimed is:

1. A process for treatment of a mineral charge characterized in that said charge a) is treated with at least one treatment agent with the general formula (1):

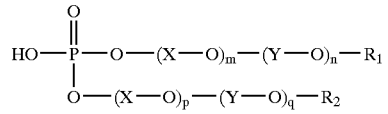

with $R_1$=either H or alkyl with $C_8$ to $C_{40}$ or aryl or alkylaryl or arylalkyl with $C_6$ to $C_{40}$, with $R_2$=either alkyl with $C_8$ to $C_{40}$ or aryl or alkylaryl or arylalkyl with $C_6$ to $C_{40}$, X=—$CH_2$—$CH_2$— or —$CH(CH_3)$—$CH_2$— or —$CH_2$—$CH(CH_3)$— or —$(CH_2)_5$—CO—, Y=—$CH_2$—$CH_2$— or —$CH(CH_3)$—$CH_2$— or —$CH_2$—$CH(CH_3)$— or —$(CH_2)_5$—CO—, X and Y being identical or different, (m+n) ranging from 0 to 60 (including limits) as well as (p+q) with $0 \leq m+n \leq 60$ and $0 \leq p+q \leq 60$ when X=Y=—$CH_2$—$CH_2$— and with ($1 \leq m \leq 10$ and $1 \leq p \leq 10$) and ($0 \leq n \leq 59$ and $0 \leq q \leq 59$) when X is different from Y;

b) undergoes a deagglomeration stage; and c) is mixed with a polyol.

2. The process according to claim 1, characterized in that said charge undergoes a further stage, a selection stage c) following deagglomeration stage b).

3. The process according to claim 1, characterized in that said treatment agent is a branched or linear $C_8$ to $C_{20}$ aliphatic alcohol acid phosphate on which there are condensed from 0 to 12 ethylene oxide motifs.

4. The process according to claim 3, characterized in that said treatment agent comprises a mixture of mono- and diesters.

5. The process according to claim 1, characterized in that said treatment agent is a mixture of decyl alcohol acid phosphate mono- and diester with 5 moles of ethylene oxide.

6. The process according to claim 1, characterized in that said treatment agent is tristyrylphenol acid phosphate monoester containing 60 moles of ethylene oxide.

7. The process according to claim 1, characterized in that said treatment agent is a mixture of ketostearyl alcohol acid phosphate mono- and diester.

8. The process according to claim 1, characterized in that said treatment agent is a mixture of nonylphenol acid phosphate mono- and diester containing 10 moles of ethylene oxide.

9. The process according to claim 1, characterized in that said treatment is performed by the dry method or by the wet method.

10. The process according to claim 1, characterized in that said charge is selected from among: natural or synthetic alkaline-earth carbonates, phosphates and sulfates, zinc carbonate, mixed salts of a magnesium and calcium, dolomites, lime, magnesia, barium sulfate, calcium sulfates, magnesium and aluminum hydroxides, silica, willastonite, clays and other silico-aluminous materials, kaolins, silico-magnesians, talc, mica, solid or hollow glass balls, metal oxides, zinc oxides, iron oxides, titanium oxide and mixtures thereof.

11. The process according to claim 10, characterized in that said charge is selected from among: natural calcium carbonates selected from among chalk, calcite and marble, precipitated calcium carbonate, dolomite, aluminum or magnesium hydroxides, kaolin, talc, wollastonite and mixtures thereof.

12. A treated mineral charge mixed with a polyol, characterized in that it is produced by a process wherein a mineral charge
   a) is treated with at least one compound of the general formula (1):

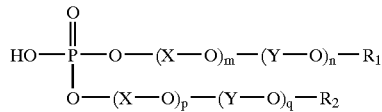

with $R_1$=either H or alkyl with $C_8$ to $C_{40}$ or aryl or alkylaryl or arylalkyl with $C_6$ to $C_{40}$,
   with $R_2$=either alkyl with $C_8$ to $C_{40}$ or aryl or alkylaryl or arylalkyl with $C_6$ to $C_{40}$,
   X=—$CH_2$—$CH_2$— or —$CH(CH_3)$—$CH_2$— or —$CH_2$—$CH(CH_3)$— or —$(CH_2)_5$—CO—,
   Y=—$CH_2$—$CH_2$— or —$CH(CH_3)$—$CH_2$— or —$CH_2$—$CH(CH_3)$— or —$(CH_2)_5$—CO—,
   X and Y being identical or different,
   (m+n) ranges from 0 to 60 (including limits) as well as (p+q) with $0 \leq m+n \leq 60$ and $0 \leq p+q \leq 60$ when X=Y=—$CH_2$—$CH_2$— and with ($1 \leq m \leq 10$ and $1 \leq p \leq 10$) and ($0 \leq n \leq 59$ and $0 \leq q \leq 59$) when X is different from Y;
   b) undergoes a deagglomeration stage;
   c) optionally undergoes a selection stage; and
   d) is mixed with a polyol.

13. The treated mineral charge mixed with a polyol according to claim 12, characterized in that said treatment agent comprises a mixture of mono- and diester.

14. The treated mineral charge mixed with a polyol according to claim 12, characterized in that said treatment agent is a mixture of decyl alcohol acid phosphate mono- and diester with 5 moles of ethylene oxide.

15. The treated mineral charge mixed with a polyol according to claim 12, characterized in that said treatment agent is the monoester of tristyrylphenol acid phosphate containing 60 moles of ethylene oxide.

16. The treated mineral charge mixed with a polyol according to claim 12, characterized in that said treatment agent is a mixture of ketostearyl alcohol acid phosphate mono- and diester.

17. The treated mineral charge mixed with a polyol according to claim 12, characterized in that said treatment agent is a mixture of nonylphenol acid phosphate mono- and diester containing 10 moles of ethylene oxide.

18. The treated mineral charge mixed with a polyol according to claim 12, characterized in that the charge to be treated is selected from among natural or synthetic alkaline-earth carbonates, phosphates and sulfates, zinc carbonate, mixed salts of magnesium and calcium, dolomites, lime, magnesia, barium sulfate, calcium sulfates, magnesium and aluminum hydroxides, silica, wollastonite, clays and other silico-aluminous materials, kaolins, silico-magnesians, talc, mica, solid or hollow glass balls, metal oxides, zinc oxide, iron oxides, titanium oxide and mixtures thereof.

19. The treated mineral charge mixed with a polyol according to claim 12, characterized in that the charge to be treated is selected from among natural calcium carbonates selected from among chalk, calcite and marble, precipitated calcium carbonate, dolomite, aluminum or magnesium hydroxides, kaolin, talc, wollastonite and mixtures thereof.

20. The treated mineral charge mixed with a polyol according to claim 12, characterized in that the charge consists of products with a mean diameter ranging between 0.1 and 15 micrometers.

21. The treated mineral charge mixed with a polyol according to claim 12, characterized in that the charge consists of products with a mean diameter ranging between 0.1 and 10 micrometers.

22. The treated mineral charge mixed with a polyol according to claim 12, characterized in that the charge consists of products with a mean diameter ranging between 0.3 and 8 micrometers.

23. The treated mineral charge mixed with a polyol according to claim 12, characterized in that the the charge is selected from among the following: a marble with mean diameter 8 micrometers, a magnesium hydroxide with mean diameter ranging between 1.4 and 1.8 micrometers, a talc with mean diameter 2.5 micrometers, a dolomite with mean diameter 3 micrometers, an aluminum hydroxide with mean diameter 0.8 micrometer, a kaolin with mean diameter 0.5 micrometer, and a precipitated calcium carbonate with mean diameter 0.30 micrometer.

24. The treated mineral charge mixed with a polyol according to claim 12, characterized in that the treated mineral charge retains its hydrophily while having a polyol intake reduced by at least 15% as compared with the untreated mineral charge.

25. Mineral-charge suspensions in polyols, characterized in that the mineral-charge suspensions contain the treated mineral charge mixed with a polyol of claim 12.

26. The mineral-charge suspensions in polyols according to claim 25, characterized in that the polyols are selected from the group consisting of of polyethers, polyesters-polyethers, and polyesters.

27. The mineral-charge suspensions in polyols according to claim 25, characterized in that the mineral-charge suspensions further contain catalysts and/or antioxidants.

28. The mineral-charge suspensions in polyols according to claim 25, characterized in that
   the concentration of dry matter in the treated mineral charge is 80% or less by weight, and
   the mineral-charge suspensions do not undergo a redhibitory decantation, or sedimentation, or thickening after undisturbed storage for 7 days.

29. Premixtures of mineral charges with a polyol, characterized in that the charges are pretreated by the process of claim 1.

30. The premixtures of mineral charges with a polyol according to claim 29, characterized in that the charges consist of a treated mineral charge, characterized in that it
   a) is treated with at least one compound of the general formula (1):

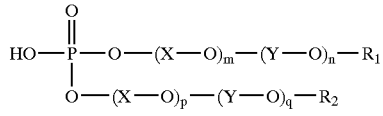

with $R_1$=either H or alkyl with $C_8$ to $C_{40}$ or aryl or alkylaryl or arylalkyl with $C_6$ to $C_{40}$, with $R_2$=either alkyl with $C_8$ to $C_{40}$ or aryl or alkylaryl or arylalkyl with $C_6$ to $C_{40}$, $X$=—$CH_2$—$CH_2$— or —$CH(CH_3)$—$CH_2$— or —$CH_2$—$CH(CH_3)$— or —$(CH_2)_5$—$CO$—, $Y$=—$CH_2$—$CH_2$— or —$CH(CH_3)$—$CH_2$— or —$CH_2$—$CH(CH_3)$— or —$(CH_2)_5$—$CO$—, X and Y being identical or different, (m+n) ranges from 0 to 60 (including limits) as well as (p+q) with $0 \leq m+n \leq 60$ and $0 \leq p+q \leq 60$ when $X=Y=$—$CH_2$—$CH_2$— and with ($1 \leq m \leq 10$ and $1 \leq p \leq 10$) and ($0 \leq n \leq 59$ and $0 \leq q \leq 59$) when X is different from Y;

b) undergoes a deagglomeration stage; and c) optionally undergoes a selection stage, where the treated mineral charge comprises a mineral selected from the group consisting of chalk, calcite, marble, precipitated calcium carbonate, dolomite, aluminum hydroxide, magnesium hydroxide, kaolin, talc, wollastonite and mixtures thereof.

31. A method of using a premixture of mineral charges with a polyol, the method comprising forming a mixture of an isocyanate and the premixtures of mineral charges with a polyol of claim 29;

foaming the mixture without an auxiliary inflation agent or with an auxiliary inflation agent selected from the group consisting of methylene chloride, acetone and $CO_2$; and manufacturing composite polyurethanes or flexible, semi-rigid or rigid polyurethane foams.

32. The method according to claim 31, characterized in that composite materials with a matrix of polyurethane are manufactured.

33. The method according to claim 32, characterized in that the composite materials are polyurethanes reinforced with cut fibers selected from the group consisting of vegetable, glass, quartz and synthetic fibers.

34. The method according to claim 32, further comprising using the manufactured composite polyurethanes or flexible, semi-rigid or rigid polyurethane foams in the field of components for the automobile industry or for the transport, road or railway sectors.

35. The mineral-charge suspensions in polyols according to claim 26, characterized in that the polyols are selected from polyethers; and the polyol polyethers are selected from the products of addition of propylene oxide to a glycol, glycerol, trimethylolpropane, or sorbitol, with or without the presence of ethylene oxide;

amine-based polyethers, obtained by addition to amines of propylene oxide or ethylene oxide;

halogenated polyethers; and graft polyethers resulting from the copolymerization of styrene and acrylonitrile in suspension in a polyether or polytetramethyleneglycol.

36. The mineral-charge suspensions in polyols according to claim 26, characterized in that the polyols are selected from polyesters; and the polyol polyesters are selected from the polycondensation products of polyacids or polyacid anhydrides with polyalcohols selected from the group consisting of diols, triols, tetrols, pentaerythritol, and mixtures thereof.

37. The mineral-charge suspensions in polyols according to claim 28, wherein the mineral-charge suspensions possess a stable Brookfield apparent viscosity lower than that of untreated mineral-charge suspensions and contain 0.5% to 3% by weight, in relation to the weight of the mineral charge, of at least one treatment agent with the general formula (1).

* * * * *